United States Patent
Horton et al.

(10) Patent No.: US 10,173,527 B2
(45) Date of Patent: Jan. 8, 2019

(54) METER CLUSTER SEAL

(71) Applicants: Thomas Horton, White Lake, MI (US); Timothy Fridley, Farmington, MI (US)

(72) Inventors: Thomas Horton, White Lake, MI (US); Timothy Fridley, Farmington, MI (US)

(73) Assignee: Nissan North America, Inc., Franklin, TN (US)

( * ) Notice: Subject to any disclaimer, the term of this patent is extended or adjusted under 35 U.S.C. 154(b) by 355 days.

(21) Appl. No.: 15/056,258

(22) Filed: Feb. 29, 2016

(65) Prior Publication Data

US 2016/0176293 A1 Jun. 23, 2016

Related U.S. Application Data

(62) Division of application No. 14/291,642, filed on May 30, 2014, now Pat. No. 9,845,009.

(51) Int. Cl.
| | |
|---|---|
| *B60K 35/00* | (2006.01) |
| *B60K 37/04* | (2006.01) |
| *B60K 37/02* | (2006.01) |
| *G01D 11/26* | (2006.01) |

(52) U.S. Cl.
CPC .............. *B60K 35/00* (2013.01); *B60K 37/02* (2013.01); *B60K 37/04* (2013.01); *G01D 11/26* (2013.01); *B60K 2350/2078* (2013.01); *B60K 2350/40* (2013.01)

(58) Field of Classification Search
CPC .................................................... B60K 35/00
USPC ......................................... 340/688; 116/305
See application file for complete search history.

(56) References Cited

U.S. PATENT DOCUMENTS

| | | | | |
|---|---|---|---|---|
| 2,746,781 A | * | 5/1956 | Jones ...................... | E21B 33/08 15/220.4 |
| 4,124,220 A | * | 11/1978 | Leone ...................... | F01L 3/08 123/188.6 |
| 4,217,625 A | * | 8/1980 | Klein ...................... | G01D 11/28 362/23.01 |
| 5,357,242 A | * | 10/1994 | Morgano ................ | B63C 11/18 340/626 |
| 5,502,615 A | * | 3/1996 | Kubota .................. | B60K 37/02 307/10.1 |
| 5,608,386 A | * | 3/1997 | Murphy, III ........... | G01D 11/28 200/56 R |

(Continued)

FOREIGN PATENT DOCUMENTS

| | | |
|---|---|---|
| DE | 202012101486 U1 | 6/2012 |
| EP | 1932709 A1 | 6/2008 |

(Continued)

*Primary Examiner* — Kristina R Fulton
*Assistant Examiner* — L. Susmitha Koneru
(74) *Attorney, Agent, or Firm* — Global IP Counselors, LLP

(57) ABSTRACT

A meter cluster includes a meter trim assembly and a combination meter. The meter trim assembly includes a meter cluster lid, a meter ring with a groove, and a seal portion having a connecting portion disposed within the groove to couple the seal portion to the meter ring. The combination meter has a transparent display cover disposed relative to the meter ring so as to form a gap between the meter ring and the transparent display cover. The seal portion is arranged to block transmission of light from a first portion of the meter cluster to a second portion of the meter cluster.

17 Claims, 9 Drawing Sheets

(56) References Cited

U.S. PATENT DOCUMENTS

| | | | | |
|---|---|---|---|---|
| 5,709,446 A * | 1/1998 | Kubota | .................. | B60K 37/02 |
| | | | | 116/286 |
| 6,585,385 B2 | 7/2003 | Nakagawa et al. | | |
| 7,369,044 B2 | 5/2008 | Ono et al. | | |
| 2003/0213181 A1* | 11/2003 | Weil | .......................... | E06B 7/16 |
| | | | | 49/492.1 |
| 2004/0189483 A1* | 9/2004 | Stringfellow | .......... | B60K 37/02 |
| | | | | 340/815.4 |
| 2006/0174814 A1* | 8/2006 | Harada | .................. | B60K 35/00 |
| | | | | 116/62.1 |
| 2007/0045899 A1* | 3/2007 | Baba | .................. | B29C 45/1418 |
| | | | | 264/259 |
| 2008/0251005 A1* | 10/2008 | Koike | .................... | G01D 11/24 |
| | | | | 116/305 |

FOREIGN PATENT DOCUMENTS

| | | |
|---|---|---|
| JP | 2005-206076 A | 8/2005 |
| JP | 2007-132737 A | 5/2007 |
| WO | 2013-047896 A1 | 4/2013 |

* cited by examiner

METER CLUSTER SEAL

CROSS-REFERENCE TO RELATED APPLICATION

This application is a divisional application of U.S. patent application Ser. No. 14/291,642, filed May 30, 2014, the entire contents of which are incorporated herein by reference

BACKGROUND

Field of the Invention

The present invention generally relates to a seal for a meter cluster in an instrument panel of a vehicle. More specifically, the present invention relates to a seal for a meter cluster that reduces light transmission from a first portion of an instrument panel to a second portion of an instrument panel.

Background Information

Conventional meter clusters are generally a plurality of molded plastic parts that are assembled and overlie gauges. These conventional meter clusters can have gaps or spaces between the molded plastic parts that allow light to pass from one portion of the instrument panel through the gap or space and onto another portion of the instrument panel. That is, the light passing through the gaps between the molded plastic parts impinges on adjacent portions of the instrument panel causing undesired glare. Additionally, due to the tolerances in the molded plastic parts, portions of adjacent molded plastic parts may contact each other causing undesirable squeak and rattle.

SUMMARY

It has been discovered that inserting a seal between the portions of a meter cluster reduces glare and light leak and simultaneously reduces squeak and rattle. In one disclosed embodiment, a seal for a meter ring comprises a sealing section and a connecting portion. The sealing section is configured to block transmission of light from a first portion of a meter cluster to a second portion of the meter cluster. The connecting portion extends from the sealing section and is configured to couple the sealing section to a meter ring.

In another embodiment, a meter cluster comprises a meter trim assembly and a combination meter. The meter trim assembly includes a meter cluster lid, a meter ring with a groove, and a seal portion having a connecting portion disposed within the groove to couple the seal portion to the meter ring. The combination meter has a transparent display cover disposed relative to the meter ring so as to form a gap between the meter ring and the transparent display cover. The seal portion is arranged to block transmission of light from a first portion of the meter cluster to a second portion of the meter cluster.

BRIEF DESCRIPTION OF THE DRAWINGS

Referring now to the attached drawings which form a part of this original disclosure.

DETAILED DESCRIPTION OF EMBODIMENTS

Figure 1:
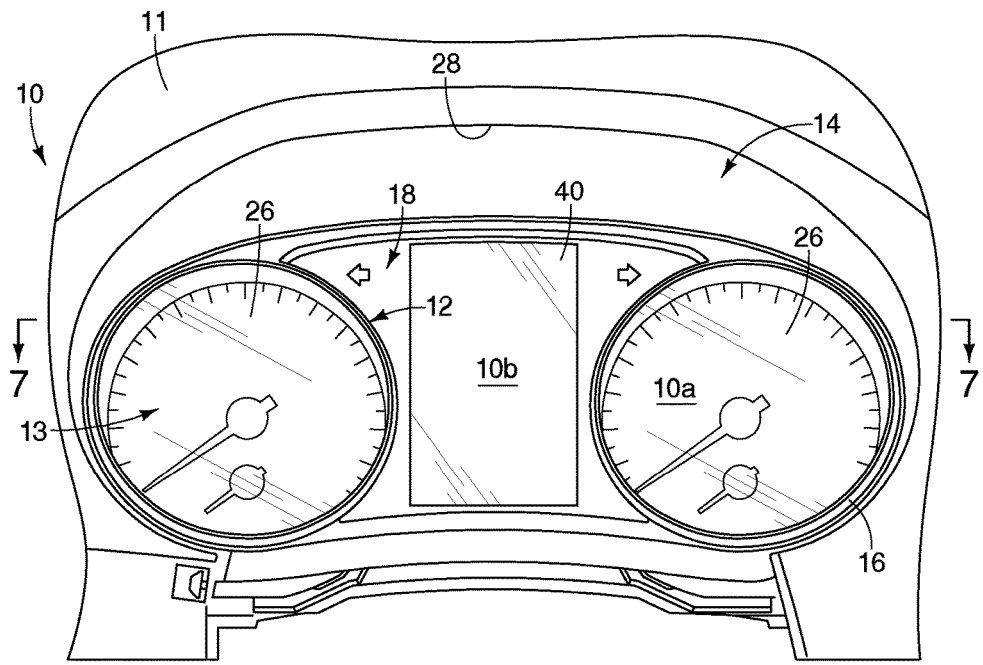
FIG. 1 is a front view of an instrument panel including a meter cluster according to one embodiment.
Figure 2:
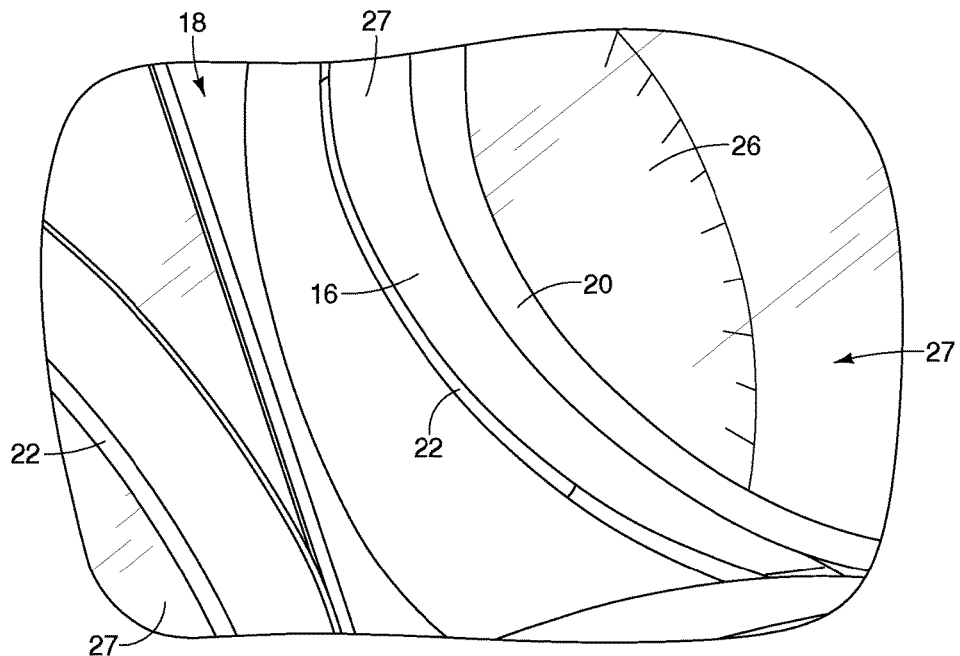
FIG. 2 is an enlarged side perspective view of the meter cluster shown in FIG. 1 including a seal portion.

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

The disclosed embodiments are for a seal or a seal portion 22 for a meter ring 16 of a meter trim assembly 12 as part of a meter cluster 10 disposed within a vehicle. For example, the meter cluster 10 can be mounted to an instrument panel 11 of the vehicle such that it faces a driver. The seal portion 22 is configured to block transmission of light between partitioned areas of the meter cluster 10 and reduce or eliminate squeak and rattle of components of the meter trim assembly 12. It is noted that the seal portion 22 can be disposed on any suitable portion of the meter cluster 10 or other portion of the instrument panel 11 to reduce or block light transmission or reduce or eliminate squeak and rattle.

Figure 7:
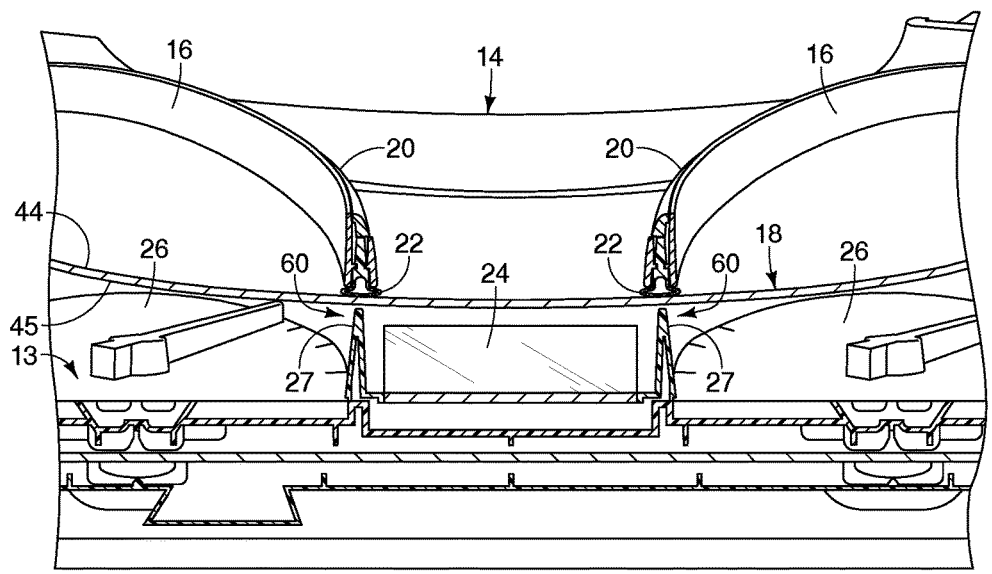
FIG. 7 is a cross-sectional view of the meter cluster along lines 7-7 shown in FIG. 1.

Referring initially to FIGS. 1 and 7, the meter cluster 10 (or instrument cluster) generally includes the meter trim assembly 12 and a combination meter 13. The meter trim assembly 12 includes a cluster lid 14 having a meter ring 16, a trim element 20, and the seal portion 22. The combination meter 13 includes a transparent display cover 18, a display screen 24 (e.g. an LCD or liquid crystal display), and instruments or gauges 26. The instruments or gauges 26 can be digital or analog gauges and can be separate from the display screen 24. On the other hand, the display screen 24 can underlie the entire cluster lid 14 having a portion that appears as a digital readout in the center of the display screen 24, and portions that appear as analog or digital instruments or gauges.

Figure 3:
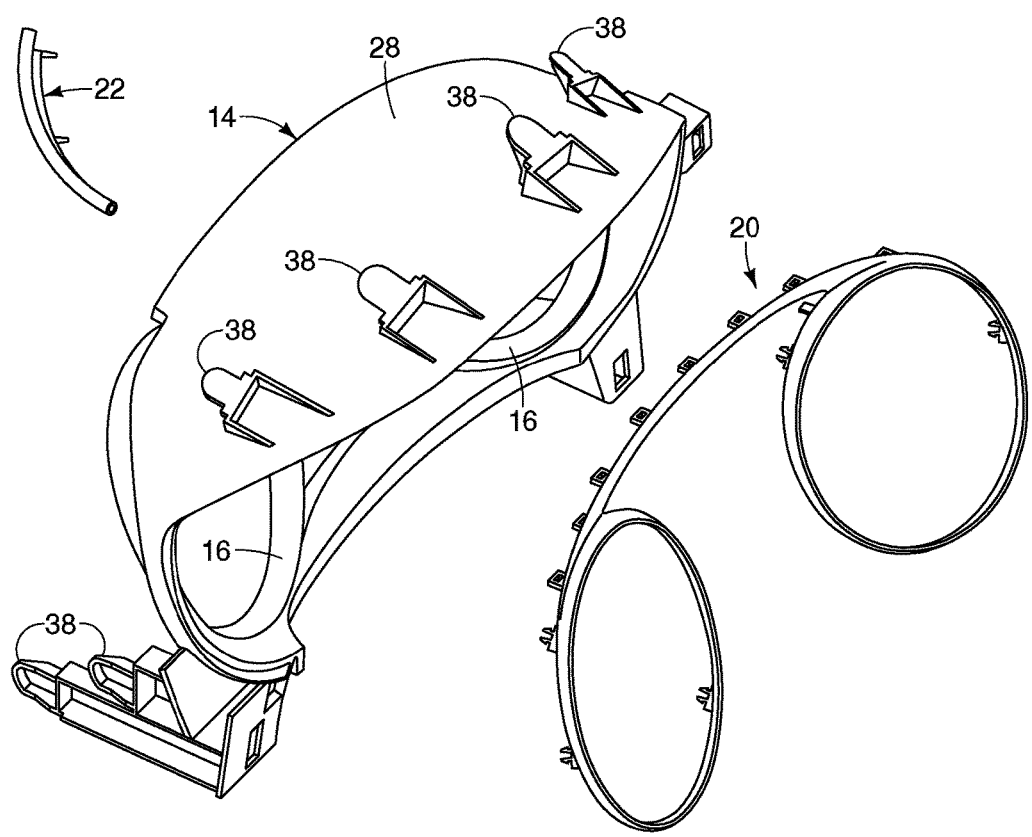
FIG. 3 is an exploded perspective view of portions of the meter cluster shown in FIG. 1.
Figure 4:
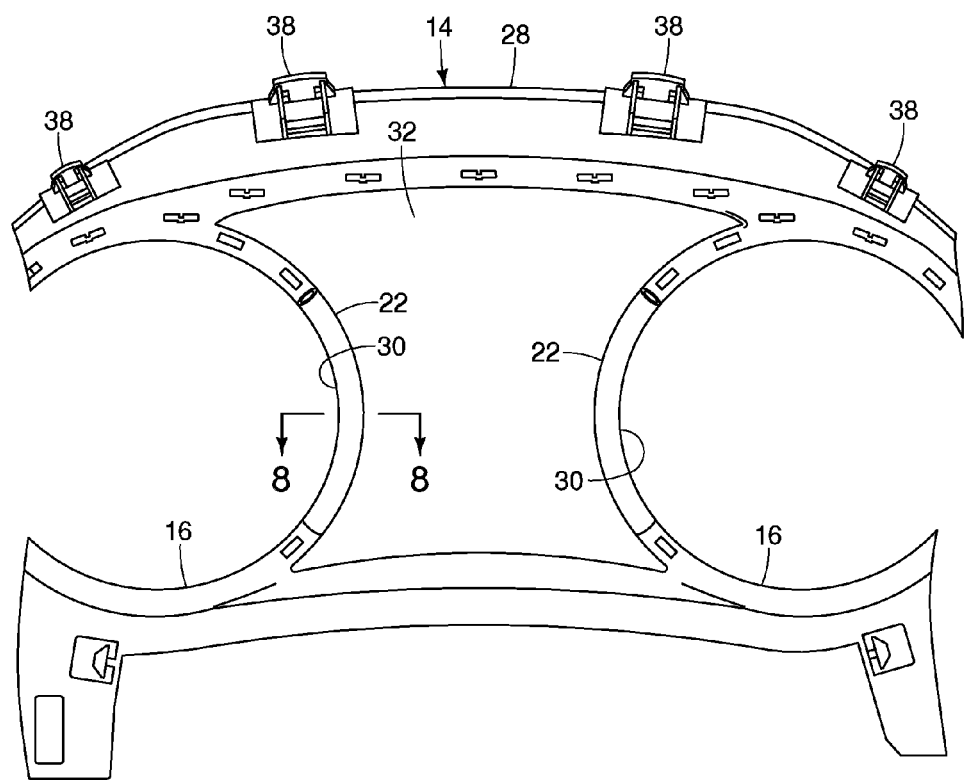
FIG. 4 is a rear view of a cluster lid from the meter cluster shown in FIG. 3 with the seal portion attached thereto.

As shown in FIGS. 3 and 4, the cluster lid 14 is a molded plastic member that couples to the instrument panel 11 and overlies the combination meter 13, which is independently coupled to the instrument panel 11. The cluster lid 14 includes a top portion 28 that extends inwardly to the passenger compartment of the vehicle to provide shade to the gauges 26 and display screen 24. In this embodiment, the cluster lid 14 includes circular openings 30 defined by the meter rings 16 for two gauges 26 (e.g., a tachometer and a speedometer). As shown in FIG. 4, the cluster lid 14 also includes an open central portion 32 that enables the display screen 24 to be seen therethrough.

Figure 5:
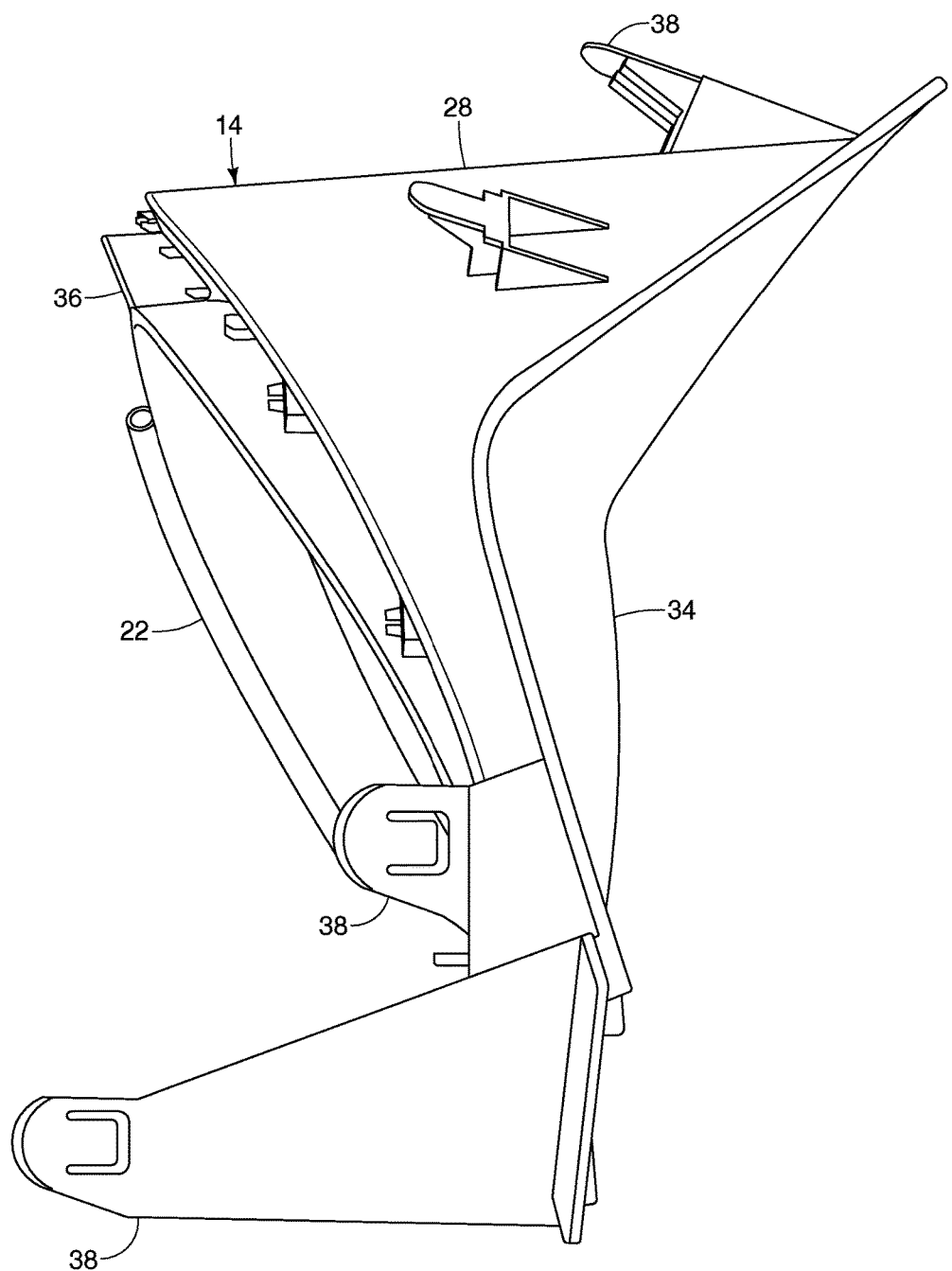
FIG. 5 is a side elevational view of the cluster lid shown in FIG. 4 with the seal portion attached thereto.
Figure 6:
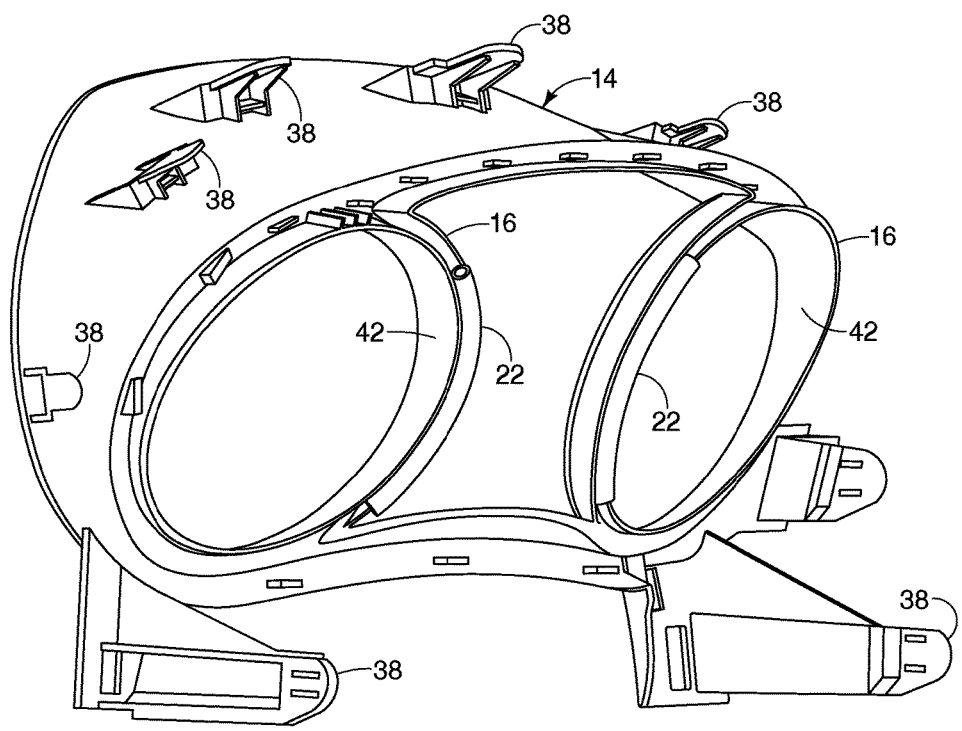
FIG. 6 is a rear perspective view of the cluster lid shown in FIG. 4 with the seal portion attached thereto.

As shown in FIGS. 4-6, the seal portion 22 is coupled to the rear side 36 of the cluster lid 14. That is, the cluster lid 14 includes a front side 34, which faces the vehicle passenger compartment and a rear side 36 that faces the instrument panel 11. A trim element 20 (for example, a chrome strip and rings) couples to or snaps to the exterior area of the top portion 28 and each of the trim rings 16 to improve aesthetics (FIG. 3). As is understood, the cluster lid 14 can couple to the instrument panel 11 in any conventional manner. For example, the cluster lid 14 can have snap-fit members 38 that enable the cluster lid 14 to be snapped into the instrument panel 11. However, it is noted that the cluster lid 14 can be coupled to the meter cluster 10 in any suitable manner.

FIG. 7 is a cross-sectional view of the meter trim assembly 12. That is, FIG. 7 illustrates the meter trim assembly 12 with the trim element 20, the cluster lid 14, the meter ring, and the seal portion 22 as well as the combination meter 13 with the transparent display cover 18, gauges 26 and the display screen 24. In this embodiment, the display screen 24 is disposed under the open central portion 32 of the cluster lid 14, forming a center display portion 40, and analog gauges 26 are disposed under each of the meter rings 16. However, the display screen 24 can be disposed under the cluster lid 14 such that the gauges 26 and the center display portion 40 are formed by the display screen 24. In other words, the entire combination meter 13 can comprise a single display programmed to simulate analog or other gauges. Such a configuration of the display screen 24 is known in the art and is therefore not discussed in detail herein.

Figure 8:
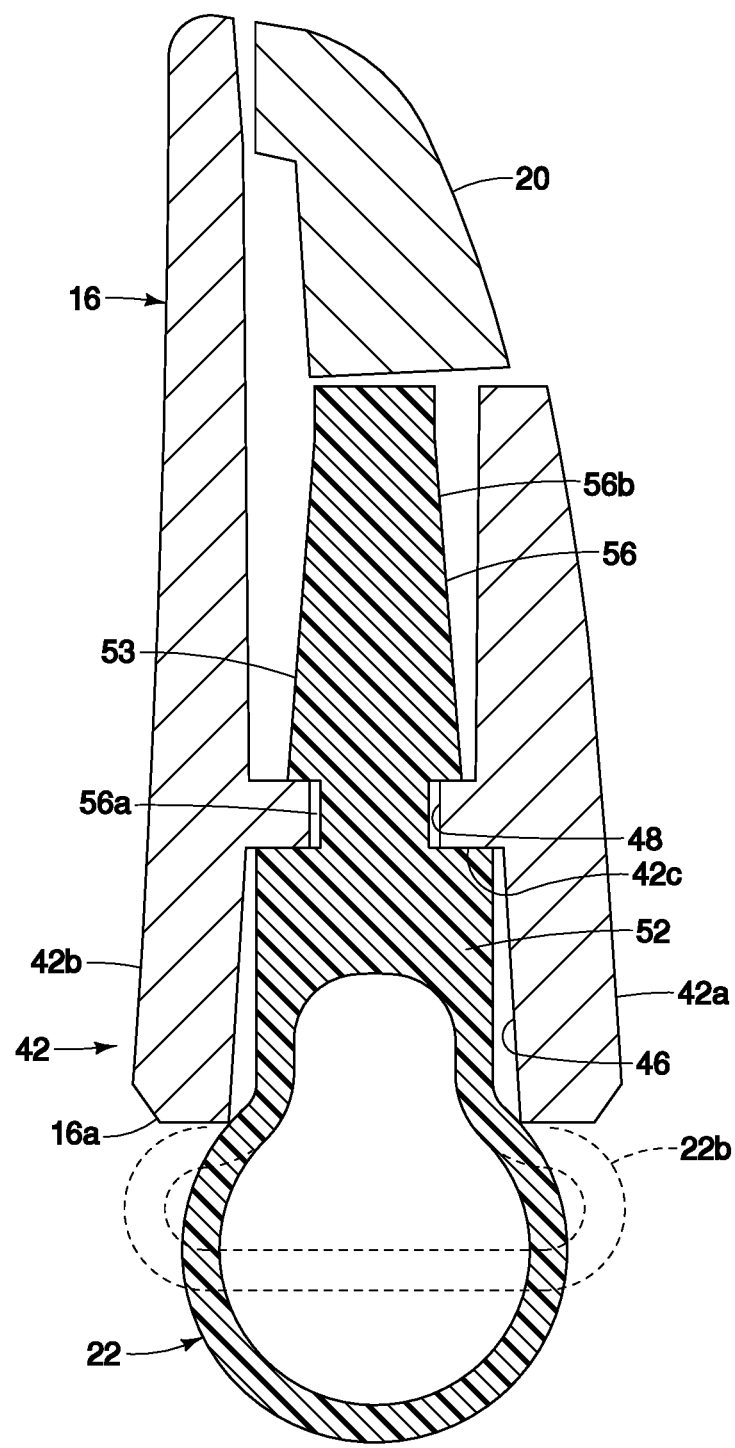
FIG. 8 is an enlarged cross-sectional view of the seal portion along lines 8-8 shown in FIG. 4.

As shown in FIGS. 6-8, each of the meter rings 16 of the cluster lid 14 includes a partition wall 42 that extends in a rearward direction from a front face of the cluster lid 14. That is, the partition walls 42 of the meter rings 16 extend in a direction away from the passenger compartment toward the instrument panel 11 when the cluster lid 14 is installed or disposed on the instrument panel 11. The partition walls 42 are configured to surround a respective gauge 26, and extend outward so as to be adjacent to an outer surface 44 of the transparent display cover 18. Likewise, the combination meter 13 includes corresponding dividing walls 27 that extend outward towards the meter rings 16. The dividing walls 27 surround the gauges 26 and have a distal end adjacent to an inner surface 45 of the transparent display cover.

As shown in FIGS. 7 and 8, the end of each of the partition walls 42 has a groove 46 therein. Thus, each of the partition walls 42 has a first partition wall section 42a and a spaced apart second partition wall section 42b that extends in substantially the same direction, thus defining the groove 46. The groove 46 can extend in an arcuate manner around the entire end 16a of the meter ring 16, forming a circle, or the groove 46 can extend around a fraction of the circumference of the meter ring 16. In one embodiment, the groove 46 occupies about 45° (FIG. 9) of radial coverage of the meter ring 16. Moreover, trim element 20 couples to the front side of the cluster lid 14 at the meter ring 16. The trim element 20 covers the seal portion 22, such that the seal portion 22 is not visible from the passenger compartment of the vehicle, improving vehicle interior aesthetics. The trim element 20 can be any suitable material, but preferably is a molded plastic element that has a chrome finish or other decorative appearance.

Figure 9:
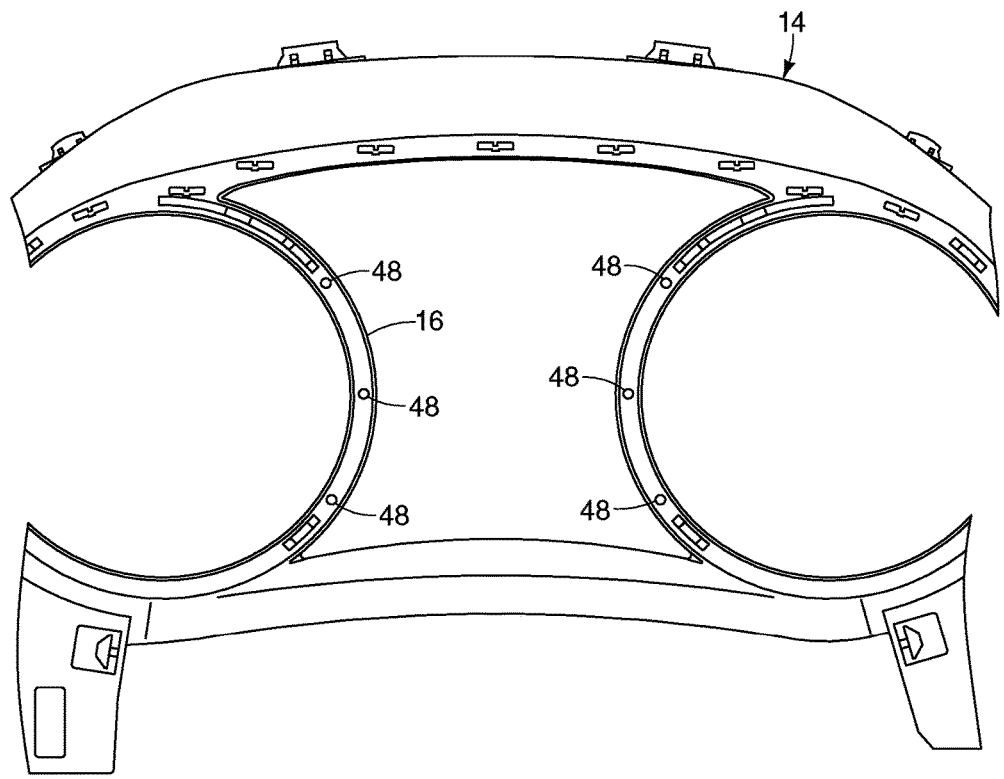
FIG. 9 is a rear view of the cluster lid shown in FIG. 4 without the seal portion attached thereto.

The groove 46 is defined by the inner surfaces of the first partition wall section 42a and the second partition wall section 42b and a bottom surface 42c. The bottom surface 42c has at least one opening 48 therein. As shown in FIG. 9, the bottom surface 42c can have three substantially circular openings 48 therein. However, as is understood, there can be as many or as few openings as desired in the bottom surface 42c. Moreover, in this embodiment, the openings 48 are equally spaced along the groove 46; however, the openings 48 may be spaced in any manner desired.

Figure 10:
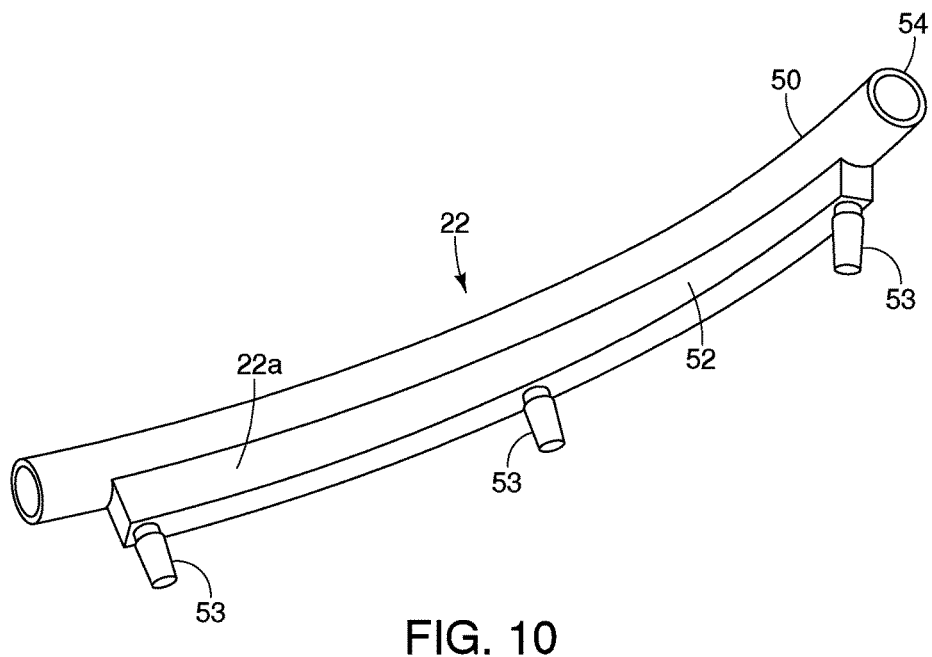
FIG. 10 is a bottom perspective view of the seal portion shown in FIG. 4.
Figure 11:
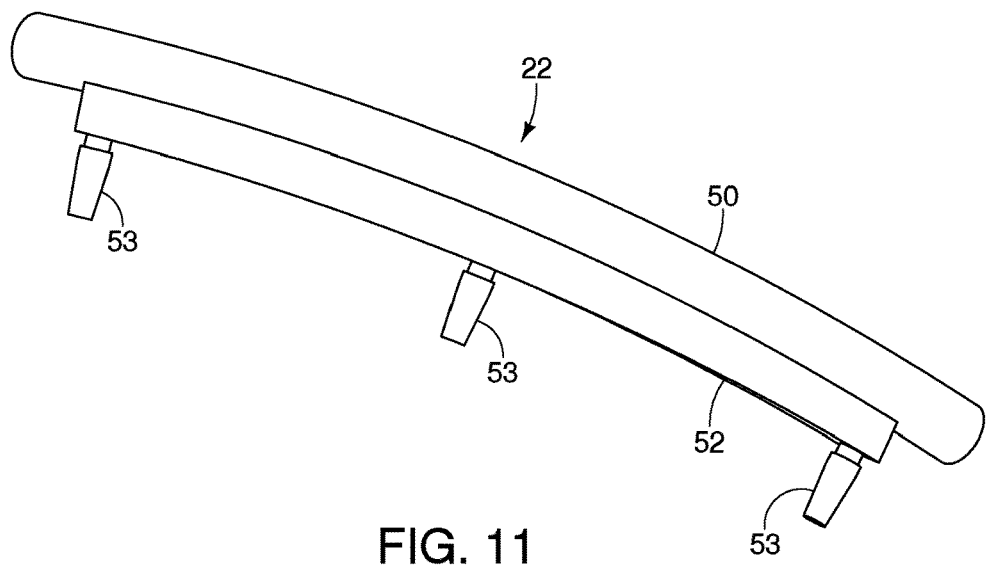
FIG. 11 is a side view of the seal portion shown in FIG. 10.

As shown in FIGS. 10 and 11, the seal portion 22 is an arcuate polymer member. The seal portion 22 has a substantially cylindrical or circular sealing section 50 and a rectangular base section 52. In one embodiment, three connecting portions 53 extend from the rectangular base section 52, and thus in a direction away from the sealing section 50. It is noted that the connecting portions 53 can extend from the sealing section, if desired. The sealing section 50 is preferably hollow and extends laterally beyond the rectangular base section 52; however, the sealing portion may extend any distance relative to the base section 52. The circular sealing section 50 of the seal portion 22 is defined by a wall 54. In one embodiment, the wall 54 of the sealing section 50 is thinner than any dimension of the connecting portion 53. Moreover, the seal portion 22 is preferably arcuately shaped or at least includes an arcuately shaped portion 22a. The arcuately shaped portion 22a has generally about the same radius as the meter ring 16 and preferably occupies substantially the same radial coverage (e.g., 45°) as the groove 46 in the meter ring 16. However, the arcuately shaped portion 22a in the seal portion 22 can have any suitable configuration.

Figure 12:
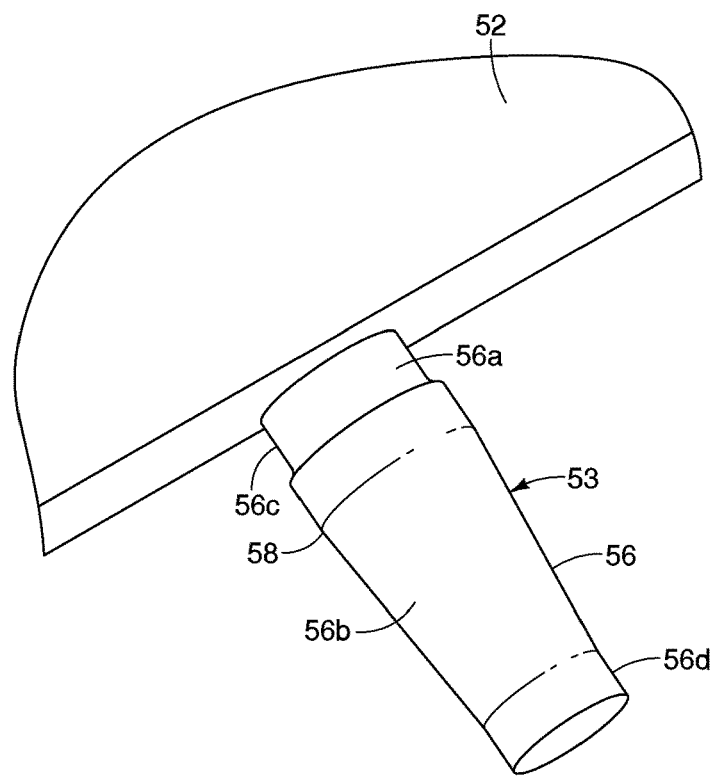
FIG. 12 is an enlarged view of a connecting portion of the seal portion shown in FIG. 10.

As shown in FIG. 12, each of the connecting portions 53 extends from the base section 52 and includes a protrusion 56 that has a first portion 56a and a second portion 56b, the second portion 56b having a diameter that is larger than a diameter of the first portion 56a so as to enable the connecting portion 53 to be coupled to the meter ring 16. In one embodiment, the first portion 56a of the connecting portion 53 is disposed at a proximal end 56c of the connecting portion 53 adjacent the base section 52. The second portion 56b is disposed at a distal end 56d and tapers in such a manner so as to gradually reduce in diameter. Thus, in this embodiment, the diameter of the protrusion 56 is largest at the second portion 56b directly adjacent to the first portion 56a. As is understood, such a configuration results in a barb 58, such that the connecting portion 53 is configured to be inserted into the opening 48 in the meter ring 16. Each of the connecting portions 53 is sized so as to be configured to be inserted into the groove 46 in the meter ring 16.

That is, as illustrated in FIG. 8, both the base section 52 and the connecting portions 53 have a width that is smaller than the width of the groove 46, so as to enable each to be at least partially inserted into the groove 46, while the sealing section 50 has a diameter or width that is greater than the width of the groove 46. If desired, the base section 52 can be sized and configured so as to form an interference fit within the groove 46. The barbs 58 enable the connecting portion 53 to be snap-fit into the openings 48 in the meter ring 16. Moreover, the base section 52, as with the second portion 56b of the protrusion 56 is larger than the diameter of the opening 48.

Figure 13:
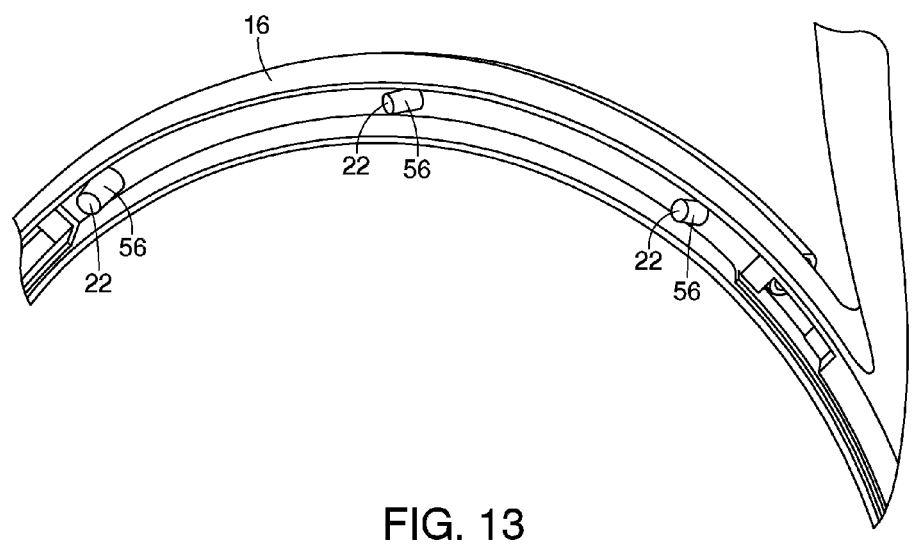
FIG. 13 is an enlarged front view of the cluster lid of FIG. 4 illustrating the connecting portion of the seal portion extending through openings in the cluster lid.
Figure 14:
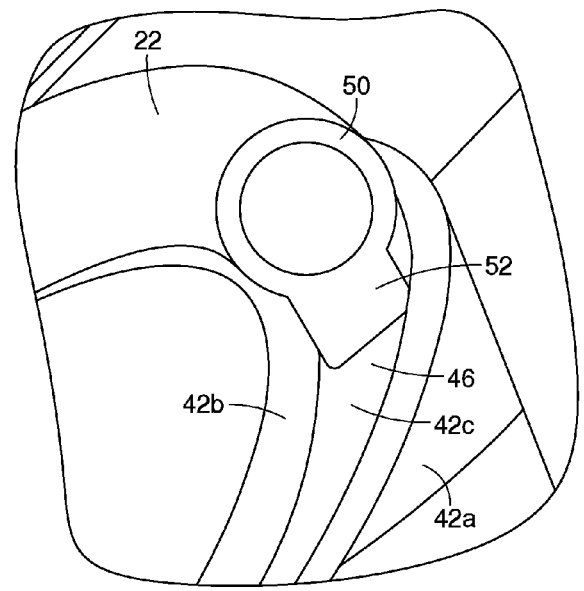
FIG. 14 is an enlarged rear view of the cluster lid of FIG. 4 illustrating the seal portion coupled to the cluster lid.

Thus, as shown in FIGS. 8, 13 and 14, the connecting portions 53 and the base section 52 are inserted into the groove 46 in the meter ring 16. Each of the connecting portions 53 is inserted into a respective opening 48 in the bottom surface 42c. The second portion 56b of each of the connecting portions 53 is inserted into a respective opening 48, such that the portion of the second portion 56b having the largest diameter passes through the opening 48 and the first portion 56a is disposed within the opening 48.

Accordingly, as shown in FIGS. 7 and 8, when both the combination meter 13 and the meter trim assembly 12 are installed to the instrument panel 11, a gap 60 or space is formed between the partition walls 42 of the meter rings 16 and the dividing walls 27 within which the transparent display cover 18 is situated. The seal portion 22 is disposed within the gap 60 and preferably the diameter of the sealing section 50 is larger than the installed distance between the meter rings 16 and the transparent display cover 18. Thus, when the base section 52 is disposed within the groove 46, the sealing section 50 is compressed between the partition walls 42 of the meter rings 16 and the outer surface 44 of the transparent display cover 18.

As is understood, the gauges 26 and/or the display screen 24 generate light. This light can escape through the gap 60 and impinge on surrounding areas. For example, the light from the gauges 26 may pass through the gap 60 and impinge of the central display portion 40 causing undesired glare. This glare is aesthetically undesirable and may affect a drivers comfort or ability to accurately read the display screen 24 and or gauges 26. Such light leak also obviates the fact that the meter rings 16 are not integrally formed with the dividing walls 27 and do not completely separate the gauges 26 from the central display portion 40. In other words, a driver would not expect to look at the central display portion 40 and see portions of the gauges 26 through the gap 60. In other situations, light may be transmitted from the central display portion 40 to the gauges 26, causing a similar issue. However, the sealing section 50 will significantly block or prohibit light from passing through the gap 60, and simultaneously reduce or eliminate any squeak and rattle between the meter rings 16 and the transparent display cover 18. As such, the sealing section 50 is configured to block transmission of light from a first portion 10a of the meter cluster 10 to a second portion 10b of the meter cluster 10. In other words, the sealing section 50 of the seal portion 22 is capable of blocking light between the gauges 26 and the center display portion 40 (see FIG. 1). However, the seal portion 22 can restrict or eliminate light from being transmitted to any portion of the meter cluster 10 desired, as well as reduce or eliminate squeak and rattle between any desired elements.

Thus, as is understood, the sealing section and/or seal portion 22 can be formed from any suitable material that would enable the appropriate deformation of the sealing section 50 to reduce or eliminate any squeak and rattle and prohibit or block light from passing through the gap 60. Moreover, the sealing section 50 can have any suitable configuration or shape that would reduce or eliminate any squeak and rattle and prohibit or block light from passing through the gap 60.

The gauges, cluster lid, display screen and structure shown under the gauges and display screen in FIG. 7 are conventional components that are well known in the art. Since these components are well known in the art, these structures will not be discussed in further detail herein. Rather, it will be apparent to those skilled in the art from this disclosure that the components can be any type of structure that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "front" and "rear", as well as any other similar directional terms refer to those directions of a vehicle equipped with the meter cluster seal. Accordingly, these terms, as utilized to describe the present invention should be interpreted relative to a vehicle equipped with the meter cluster seal.

The term "configured" as used herein to describe a component, section or part of a device includes hardware and/or software that is constructed and/or programmed to carry out the desired function.

The terms of degree such as "substantially" and "about" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claims is:

1. A meter cluster comprising:
   a meter trim assembly including,
      a meter cluster lid,
      a meter ring with a groove, and
      a seal portion having a connecting portion disposed within the groove to couple the seal portion to the meter ring; and
   a combination meter having a transparent display cover disposed relative to the meter ring so as to form a gap between the meter ring and the transparent display cover,
   the seal portion being arranged to contact the transparent display cover and block transmission of light from a first portion of the meter cluster to a second portion of the meter cluster.

2. The meter cluster according to claim 1, wherein
   the meter ring includes a partition wall that surrounds a gauge, the partition wall extending outward so as to be adjacent to an outer surface of the transparent display cover.

3. The meter cluster according to claim 2, wherein
the combination meter includes a dividing wall that surrounds the gauge and extends towards the meter ring such that a distal end of the dividing wall is situated adjacent to an inner surface of the transparent display cover.

4. The meter cluster according to claim 2, wherein
the seal portion includes a sealing section that is compressed between the partition wall and the outer surface of the transparent display cover.

5. The meter cluster according to claim 4, wherein
the sealing section is configured to be compressed so as to form a substantially uniform cross section.

6. The meter cluster according to claim 4, wherein
the sealing section is substantially cylindrical.

7. The meter cluster according to claim 4, wherein
the sealing section is hollow.

8. The meter cluster according to claim 7, wherein
a wall of the sealing section is thinner than any dimension of the connecting portion.

9. The meter cluster according to claim 4, wherein
the sealing section has a width that is greater than a width of the connecting portion.

10. The meter cluster according to claim 4, wherein
the sealing section is configured to be inserted into a gap defined by the meter ring and a transparent display cover.

11. The meter cluster according to claim 1, wherein
the connecting portion includes a barb configured to be inserted into an opening in the meter ring.

12. The meter cluster according to claim 1, wherein
the seal portion is arcuately shaped such that the seal portion extends along a peripheral contour of the meter ring.

13. The meter cluster according to claim 12, wherein
the arcuately shaped seal portion is configured to occupy at least 45° of radial coverage about a circumference of the meter ring.

14. The meter cluster according to claim 1, wherein
the connecting portion includes a protrusion that has a first portion and a second portion, the second portion having a diameter that is larger than a diameter of the first portion so as to couple the connecting portion to the meter ring.

15. The meter cluster according to claim 1, wherein
the seal portion is configured to reduce contact between the meter ring and a transparent display cover.

16. The meter cluster according to claim 1, wherein
the connecting portion is configured to snap fit into an opening in the meter ring.

17. A meter cluster comprising:
a meter trim assembly including,
    a meter cluster lid,
    a meter ring with a groove, and including a partition wall that surrounds a gauge, and
    a seal portion having a connecting portion disposed within the groove to couple the seal portion to the meter ring; and
a combination meter having a transparent display cover disposed relative to the meter ring so as to form a gap between the meter ring and the transparent display cover,
the partition wall of the meter ring extending outward so as to be adjacent to an outer surface of the transparent display cover,
the seal portion including a sealing section that is compressed between the partition wall and the outer surface of the transparent display cover, and
the seal portion being arranged to block transmission of light from a first portion of the meter cluster to a second portion of the meter cluster.

* * * * *